3,243,106
APPARATUS AND METHOD FOR SEPARATING
PARTICLES IN LIQUIDS
Edward Atherton and Albert Charles Cooper, Manchester, England, assignors to Imperial Chemical Industries Limited, London, England, a corporation of Great Britain
Filed Feb. 18, 1963, Ser. No. 259,196
Claims priority, application Great Britain, Feb. 20, 1962, 6,548/62
4 Claims. (Cl. 233—27)

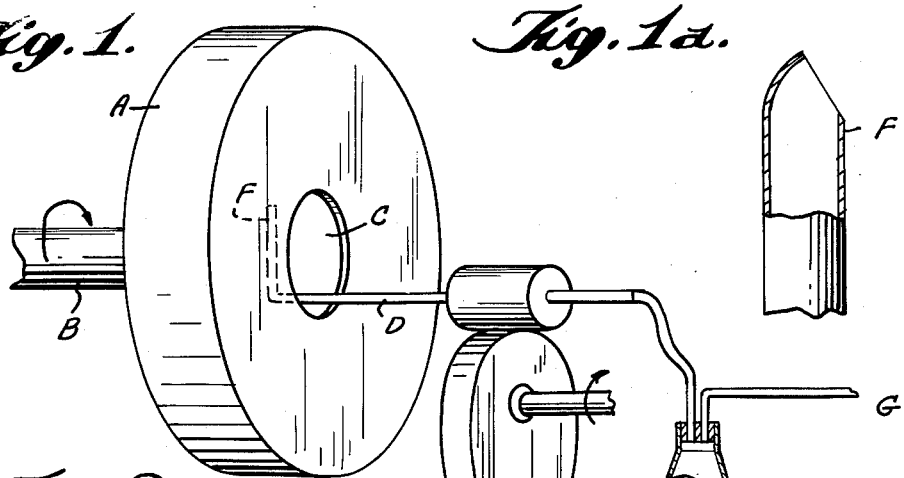
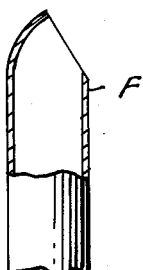
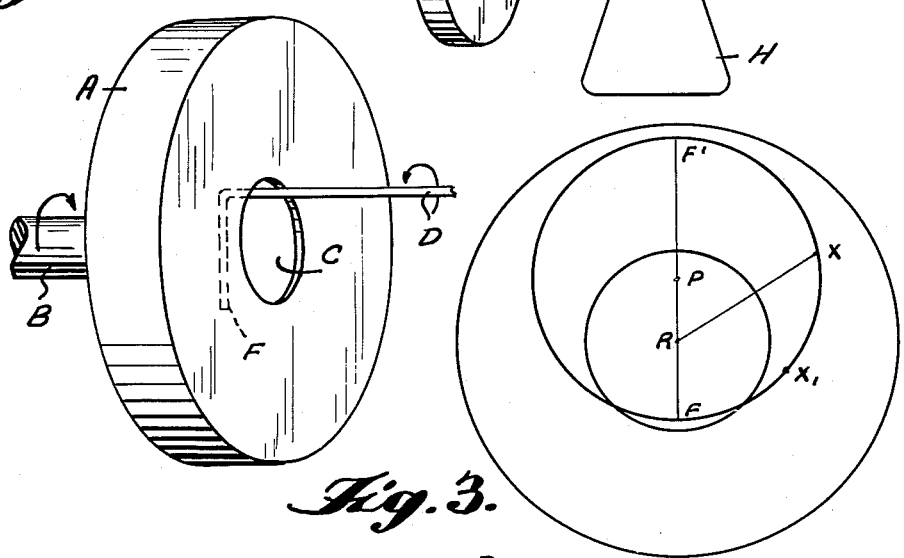
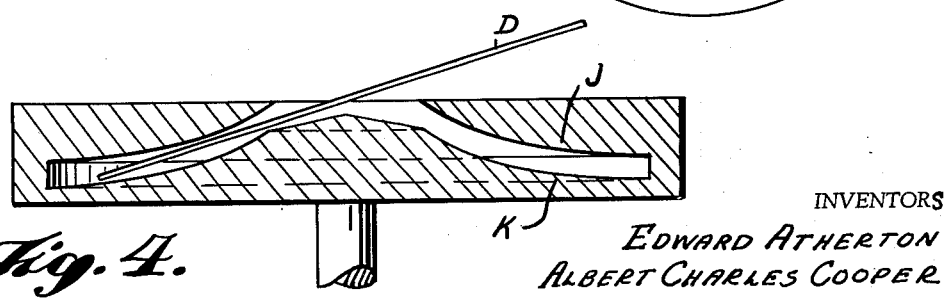

This invention relates to methods and apparatus for separating particles in suspension in liquids.

In many operations it is desirable to perform such separations, for example, to measure the size distribution of the particles, to separate the smaller particles from the larger, or the lighter particles from the more dense. Thus, for example, in the manufacture of aqueous dispersions of pigments used for coloration purposes it is important to control the particle size of the pigments and to know the particle size distribution of the product. Various methods have hitherto been proposed for performing these operations.

For particles of micron and sub-micron size, such as are found in very many commercially important dispersions, the rates of fall through liquids under the action of gravity alone are so low that the separation of particles of different mass or size by gravity sedimentation becomes unattractive or impossible. It has long been the practice to use centrifugal forces to speed up the separation of such particles. By using high rotational speed it is possible to speed up the sedimentation rate many thousands of times over the rate obtaining when gravity alone is used.

Three main difficulties are inherent in the centrifugal methods of separation used hitherto:

(1) The force causing sedimentation of the particles is not constant, but varies with distance from the centre of rotation.

(2) The tracks followed by individual particles in the separation are not parallel, but all diverge from the centre of rotation.

(3) Observation and manipulation of the suspension is difficult in a system which may be rotating at many thousands of revolutions per minute.

The first difficulty may be dealt with by making the radius of rotation of the centrifuge bucket or cell large in relation to the distance travelled by the particles, and then assuming that the acceleration is constant over that distance. This may involve large unwieldy, rotating masses, and in the case of high speed centrifuges it is usually desirable to keep the rotating parts compact, and accept that sedimentation rate will be different at different distances from the axis of rotation, taking this into account by using the correct mathematical expression for the motion of a particle between any two chosen values of radius. This was the approach used by Svedberg and Nichols in developing the ultracentrifuge.

A consequence of the second difficulty, is that cylindrical centrifuge buckets may not be used, for in such containers the divergence of the tracks of the particles brings some of them in contact with the walls, and in so doing creates a local increase in concentration of the suspension. The effect of a slight change in suspension density is enormously magnified by centrifugal force and induces streaming of the bulk of suspension, outwards along the walls of the container, with a balancing inward flow in the centre. This effect can be avoided only by the use of sector shaped cells or containers. These are not easy to manufacture, especially for use with the higher rotational speeds which generate high liquid pressures in the cells.

The most serious difficulty is that of access to a rapidly rotating system. The classical method used to overcome this is to make the container for the suspension with at least two walls transparent, and to pass a beam of light through the suspension while the latter is in rotation. Under suitable conditions it is possible to deduce the rate of travel of particles in the suspension and their state of subdivision.

At best, the method involves considerable complication, and the construction of centrifuges and optical systems of high precision and stability. Restrictions are also placed on the design of rotor and materials of construction. Calculation of the desired information is very difficult if the suspension contains particles of a wide range of sizes, or if the particles are opaque or highly coloured. This is because of the varying, and usually unknown relation between the size and shape of the particle and their observed effects on the light beam.

To avoid the complications and uncertainties of optical measurement on the rotating suspension means have been described for removing a sample from the rotating mass of suspension by use of a device attached to, and rotating with, the centrifuge container, and caused to operate at the desired time by electric, hydraulic or other appropriate means, or by the fusion or burning of a restraining thread.

All such devices add considerably to the weight and complexity of the centrifuge. They do not remove the uncertainty which exists at the start of the operation, when the centrifuge is accelerating from rest. The inertia of the suspension tends to make it lag behind the movement of the container so that unless the container is completely filled, to leave no free liquid surface swirling motions are set up for an indeterminate length of time. The error thus introduced is particularly serious when the larger or heavier particles having short settling times are being studied.

Swirling is also caused whenever any sample is withdrawn from below the free surface of the suspension while the centrifuge is in operation. During the sampling operation all the suspension nearer to the free surface than the point of sampling must move outwards to greater radii, and in so doing undergo an increase in angular momentum. The liquid will swirl against the rotation of the centrifuge until viscous forces have transferred the necessary energy. This means that the act of sampling is sufficient to cause mixing of the suspension and thereby introduction of errors.

We have now found that the difficulties hitherto encountered in separatory processes involving the use of centrifuges can be obviated by employing a centrifuge in the form of a single hollow container rotated about an axis within the boundaries of the container, and having no internal divisions to prevent the introduction of a sampling device, such device being introduced into the container nearer to the axis of rotation than the free surface of the suspension under rotation in the container, the device being capable of removing liquid from the immediate vicinity of the air-liquid interface and of moving in contact with such interface as it recedes radially due to the removal of liquid, and not being part of, directly attached to, or rotating at the same speed as the rotating container or rotor.

For operating the invention, the rotating parts of the centrifuge are brought up to steady running speed before the introduction of the suspension of particles and are maintained at that steady speed during the whole duration of the separation process, including the withdrawal of a desired and defined portion of the treated suspension at an appropriate time.

For sampling suspensions which are subjected to powerful centrifugal forces and in which the sedimentation rate of particles is high, it is desirable that the removal of the sample should take place as rapidly as possible. The rate of removal of the sample is limited by the liquid transferring capacity of the sampling device, which must therefore be loaded as heavily as possible. The volume of liquid in the container per unit distance measured from the axis of rotation increases with the total distance or radius, hence in order to avoid overloading it is preferred that the permitted rate of movement of the sampling device into the container is a maximum at the start of sampling, and decreases uniformly as liquid is removed. The orifice of the sampling device is of such a shape and the device operated in such a manner that the act of withdrawal of the liquid sample causes a minimum of disturbance to the liquid remaining in the container or rotor during the sampling cycle. In general the sampling device is brought into contact with the liquid at a controlled speed and in a predetermined direction. The part of the sampling device first coming into contact with the liquid may suitably have a sharpened leading edge which is presented at such an angle that the liquid at the air/liquid interface is skimmed off whilst under rotation as it comes in contact with the leading edge and is drawn off for example under vacuum through a tube introduced through an axial opening into the rotor.

Thus according to the present invention we provide an apparatus for separating particles contained in liquid dispersions of such particles which comprises a rotor suitable for containing liquids, the rotor internally being of such shape that when rotated about an axis within the boundaries of the rotor, such axis being preferably an axis of symmetry, the minimum extension in the radial direction is at least twice the extension in the axial direction, and the liquid retaining surfaces of the rotor extending in the radial direciton are at all points substantially parallel to the path which would be followed by a particle in suspension moving under the combined influences of gravity and the centrifugal force due to the rotation of the rotor, and that the air-liquid interface or free surface of a liquid placed in and rotating with the rotor is continuous and unbroken over the whole of its extent and in the form of a complete surface of revolution; an axial opening in the rotor for introducing liquid while the said rotor is under rotation, and means for the progressive withdrawal, while the rotor is under rotation of particles together with accompanying liquid from a dispersion in the rotor at a predetermined rate through the said axial opening the withdrawal means being capable of operating at the air-liquid interface as described above, advancing towards the interface, through and beyond the position originally occupied by the interface, at a controlled rate which is preferably, but not essentially proportional to the inverse of the radius of curvature of said interface.

It is a feature of the invention that the withdrawal means is such that liquid remaining in the rotor is not disturbed by the act of withdrawal sufficiently to invalidate such hydrodynamic calculations as may have been applied to the motor of particles in the liquid.

The invention also includes a process for the separation into component parts of dispersions of particles in liquids, which comprises placing the dispersions into the rotor shaped as described above, and in rotatory motion about an axis within the boundaries of the rotor, so that the air-liquid interface assumes the form of a complete surface of revolution, or placing the dispersion into the air-liquid interface of a liquid of greater density than that of the dispersion and already in rotation in such a rotor as above described, subjecting the dispersion of particles to the rotatory motion for a defined length of time and progressively withdrawing a desired portion of the particles and accompanying liquid in the manner as described above withdrawal being conducted by a device which is not part of, directly attached to, or rotating at the same speed as the rotating container, and in such a manner that suspension remaining in the rotor is not appreciably disturbed so as to cause mixing.

Additionally our invention comprises a method or process applicable to the improvement or control of the manufacture of dispersions of particles in liquids or of products in particulate form which may be dispersed in liquids, which makes use of the above described apparatus in the determination of the particle size distribution of the dispersion, and a method or process applicable to the improvement or control of the manufacture of such particles which employs the process as above described in the determination of the particle size of the dispersion.

The apparatus may be used as an analytical tool in the determination of the particle size distributions of suspensions of particles in liquids, or it may be used to prepare small quantities of particle dispersions in which the particles are of known size within very close limits.

In the first application, the apparatus is of very great utility wherever it is desired to determine the distribution of size or mass of particles in liquid suspensions, if such particle sizes are in the range normally examined by sedimentation analysis. In particular may be mentioned devlopment and control work with pigments, dyestuffs, pharmaceutical products, minerals and powdered metals.

The apparatus may also be used for the production of small samples of dispersions in which the particles are of accurate known size. Such dispersions have commercial value for calibration of various instruments, or as internal standards in the microscope examination of dispersions. Synthetic polymer latices of uniform particle size are used as standard specimens in electron microscopy. In the preparation of such latices it sometimes happens that a small proportion of oversized particles is produced by coalescence of two or more droplets of the material during polymerisation. These may be removed very easily in the apparatus of the present invention.

In the use of the apparatus there is no limitation to the orientation of the rotor if its rotational speed is sufficiently high for gravitational acceleration to be negligible compared with centrifugal acceleration. The speed of rotation is varied according to the sizes of particles it is desired to separate and to their densities relative to the suspending liquid. Speed is reduced when larger or heavier particles are being treated, but with the axis of rotation horizontal, a limit is set by the speed below which the position of the liquid in the rotor tends to become unstable. In practice this is found to be about 700 r.p.m. for a rotor of 10 cm. internal diameter. Accordingly, at lower rotational speeds, the rotor must be used with axis of rotation vertical. This form of rotor is preferred for particles in the size range 4 to 25 microns, of specific gravity about 1.5, and dispersed in water. Similar particles of size 5 microns and below are separated in a rotor running at greater than 700 r.p.m. and with its axis at any convenient angle to the horizontal.

The invention is illustrated, but not limited, by the following examples.

*Example 1*

One form of our apparatus is represented by FIGURE 1 of the accompanying drawings. In this drawing the container is in the form of a hollow disc A, which is conveniently, but not necessarily, made from a transparent material such as, for example polymethyl methacrylate resin. It is attached to the horizontal shaft B of an electric motor and rotated at uniform speed. In one face of the disc an aperture C allows the particle suspension or other liquid to be injected into the disc (or rotor) and also allows entry for a sampling probe D which is a thin walled steel tube bent so that a portion at the end is parallel to a radius of the disc. By means of a cam E, acting on the holder of the probe, the probe may be moved inside the hollow disc to contact the liquid surface. The extreme end of the probe is bent and cut off at an angle, and sharpened as in detail F (FIGURE 1a) to enable it to skim off the surface layers of liquid in the rotor, which liquid is removed from the probe by suction at G, and transferred to a suitable collecting vessel H. As the probe advances into the rotor, liquid is progressively removed without disturbance to the underlying liquid, the desirable decreasing rate of advance being given by forming a suitable profile on cam E.

*Example 2*

An alternative form of sampling device is arranged as shown in FIGURE 2, of the accompanying drawings, in which the rotor A has the same form as in Example 1, but the probe D instead of being given a lateral motion by means of a cam or similar device, is caused to rotate at a constant low speed about an axis extending parallel to, and separate from, the axis of rotation of the rotor. In FIGURES 2 and 3, R represents the centre of rotation of the disc A, with aperture C. The end part of the probe represented by PF rotates about an axis through P normal to the plane of the diagram (FIGURE 3), so that the tip F of the probe describes a circuit which penetrates into the hollow centre of the rotor to a maximum depth indicated at $F^1$. A line such as RX indicates the radial penetration of the probe into the rotor at intermediate positions of the probe. It may be shown by simple mathematics, or graphically, that the penetration of the probe tip into the rotor, i.e. the distance RX, increases rapidly at first, reaching a maximum rate after about 50 degrees rotation of the probe, the tip of the probe then being at the point indicated by $X_1$ and about to make contact with the liquid in the rotor. Further penetration occurs at decreasing rate, until the motion of the probe tip becomes tangential to the liquid surface at $F^1$, thereafter completing the circle to its rest position. The motion described is a close enough approximation to the preferred steadily reducing rate to give excellent results in practice, with little mechanical complication.

In this example the disc has outer dimensions 12.5 cm. diameter by 3 cm. thick, the cavity being 10 cm. diameter by 0.6 cm. deep, and the aperture in the front face being 4 cm. diameter. The disc is attached to the output shaft of a variable speed gearbox driven by an electric motor of ¼ H.P., giving a range of speeds to the disc of 750 to 4500 r.p.m.

The probe is of 2 mm. bore stainless steel tube, rotated during the act of sampling at a constant speed of 1 r.p.m.

*Example 3*

In another form of the apparatus the rotor has the shape of a hollow circular disc attached to the vertical shaft of an electric motor or to a vertical shaft suitably supported in bearings and capable of being rotated at uniform speed. The cavity in the rotor is bounded at its upper and lower limits by parallel surfaces J and K, which are surfaces generated by the rotation about the rotor axis of lines having equations of the form $y = k \log x$ wherein $k$ is a constant depending on physical dimensions and speed of the rotor, and $y$ and $x$ are co-ordinates in the axial and radial directions of the rotor respectively. The form is illustrated in FIGURE 4 of the accompanying drawings which represents a diametral section of such a rotor parallel to its axis of rotation. Within the diameter of the aperture in the top face of the rotor it is not necessary that the lower face should have the form specified. It is to be noted that in certain circumstances, that portion of the line $y = k \log x$ which is used for generating the curved surfaces is sufficiently close to a circular arc for the latter to be used in practice, with consequent gain in the case of construction. Within such a rotor, rotating uniformly at its designed speed, particles in a suspending liquid move under the combined influence of gravity and centrifugal force along paths which are at all points parallel to the upper and lower walls of the cavity, and therefore the particles have no tendency to settle against the walls and interference with the process of separation is thereby avoided.

The sampling device used with this design of rotor is a length of thin walled tube, with its end cut at an angle and ground or filed to a smooth edge. It is moved into and out of the rotor cavity by displacement along its own axis, the rate and magnitude of such displacement being controlled by a rotating cam of suitable profile acting upon a sliding holder for the tube D. Liquid picked up by the sharpened tip of the probe is removed by suction to a suitable vessel for subsequent use or analysis.

Typical dimensions of the rotor sketched in FIGURE 4 are 16 cm. diameter by 3 cm. thick overall, with the maximum cavity diameter 13 cm. the faces being generated by the rotation about the rotor axis of suitably disposed circular arcs of radius 13.3 cm. the top face having a central hole 3.8 cm. diameter. The designed speed for such a rotor is 300 r.p.m.

*Example 4*

A dispersion in water of a yellow pigment is diluted with water to a pigment content of approximately 1%. This diluted suspension is referred to in the succeeding description as suspension A. The yellow organic pigment is known to have a specific gravity of 1.45 and to be soluble to a small extent in acetone.

The apparatus, as described in Example 2, is prepared for use by setting its speed of rotation to 1500 r.p.m. and placing in the cavity 40 ml. of an aqueous sucrose solution which is referred to as the "fill." The fill has the following composition:

Sucrose _____ gm__ 40
Anionic dispersing agent _____ gm__ 4
Non-ionic wetting agent _____ gm__ 0.01
Water to _____ litre__ 1

The rotor is first calibrated by actual measurement, so that the relation between volume of liquid in it and the radius of the free surface of the liquid is known. The sampling device is also so preadjusted that the final depth of penetration of the probe into the rotor cavity is known.

Using a hypodermic syringe with blunted needle, 0.5 ml. of the suspension A is injected into the rotor cavity in such a manner as to form a thin, even layer on the surface of the fill already contained in the rotor. In order to do this, the suspension is directed against the rear wall of the cavity near the axis of rotation. The suspension then flows outwards as a very thin film under centrifugal force, and picks up the rotational speed of the rotor before meeting the surface of the fill. It remains on the surface of the fill by reason of the greater density of the sucrose solution. At the instant of injection of suspension A, a stop clock is started, and the sampling probe moved into the rotor cavity, but not yet caused to rotate.

From the known physical constants of the system it can be calculated that at 4 minutes 11 seconds after injection of the suspension A, particles of 2 microns diameter, calculated as Stokes equivalent spheres, will just have reached the radius corresponding to the deepest penetration of the probe. All larger particles will at that time be at longer radii, and all smaller particles will be at shorter radii. Accordingly, at 3 minutes 41 seconds after injection, the probe is set into rotation at 1 r.p.m., and exactly 30 seconds later, i.e. at the desired time of 4 minutes 11 seconds, it has reached its deepest penetration.

The dimensions of the apparatus and speed of sampling have been so chosen that at no time in its travel is the probe tip in advance of the position reached by the particles it is desired to collect.

Liquid extracted by the probe is drawn by suction into a 50 ml. volumetric flask. This liquid contains all particles of the original 0.5 ml. of suspension A that are below 2 microns diameter, calculated as Stokes equivalent spheres. The flask is labelled, stoppered, and put aside for analysis.

On stopping rotation of the disc, the remaining liquid and those particles greater in diameter than 2 microns may be removed by means of a thin flexible tube attached to a suction collecting flask, and either rejected as waste or retained for confirmatory analysis or use.

The cleaned rotor is now restarted at 2,000 r.p.m. and a fresh 40 ml. of fill placed in it. As before, 0.5 ml. of suspension A is injected to form a surface layer and allowed to remain for 3 minutes 41 seconds before starting the sampling probe. The extracted liquid in this instance contains only those particles smaller than 1.5 microns.

Repeat runs are made, varying conditions as in the table below, to produce extracted fractions with a range of maximum particle diameters.

| Maximum diameter (microns) | Rotor speed, r.p.m. | Volume of fill, ml. | Start probe after— |
|---|---|---|---|
| 1.0 | 3,000 | 40 | 3 min. 41 sec. |
| 0.75 | 3,500 | 40 | 4 min. 59 sec. |
| 0.5 | 3,000 | 20 | 4 min. 10 sec. |
| 0.3 | 3,000 | 10 | 3 min. 14 sec. |
| 0.2 | 3,500 | 10 | 5 min. 42 sec. |
| 0.1 | 3,500 | 10 | 24 min. 18 sec. |

To each flask containing an extracted fraction is added 20 ml. water and then sucrose solution (fill) up to a total of 50 ml.

Three further flasks are prepared by placing in each 0.5 ml. of suspension A and 20 ml. water, then filling up to 50 ml. with the sucrose solution.

Each of these three flasks contains all particle sizes of the suspension being separated, and accordingly the concentration of pigment in them represents 100% on the cumulative size distribution curve. These flasks are referred to as controls, being made up in triplicate for greater accuracy. It is to be noted that the controls contain all sizes of particles, including the possible small percentage of very large particles, for which the statistical sampling error is high, but which do not appear in the fractions extracted from the centrifuge.

Solutions are prepared from each of the extracted sample flasks and each of the controls, by withdrawing 5 ml. and diluting to 50 ml. with a mixture of 90 volumes acetone with 10 volumes water.

The optical density of each solution and of a blank made from the solvents without pigment is measured at 411 millimicrons wavelength (for the particular pigment being examined), in a suitable spectrophotometer. Values for the three controls are averaged and equated to 100% pigment. The extracted samples all give values corresponding to the weight percentage of pigment in them, and thus to the weight percentage below the stated particle size.

Figures in the table below illustrate typical results.

| Particle diameter, micron | Optical density | Density minus blank | Weight percent under size |
|---|---|---|---|
| Control | .400 | | |
| Do | .400 | .357 | 100 |
| Do | .400 | | |
| 2 | .398 | .355 | 99.5 |
| 1.5 | .393 | .350 | 98 |
| 1.0 | .376 | .333 | 93.5 |
| 0.75 | .369 | .326 | 91.5 |
| 0.5 | .338 | .295 | 83 |
| 0.3 | .274 | .231 | 64.5 |
| 0.2 | .204 | .161 | 45 |
| 0.1 | .106 | .063 | 17.5 |
| Blank | .043 | | |

*Example 5*

The apparatus described in Example 3 is used in the following manner to determine the distribution of particle size in a coarse dispersion of a blue vat dye. The dispersion is diluted to contain approximately 0.5% of actual dyestuff to form suspension A.

The rotor, of the shape and dimensions shown in Example 3, is rotated at 300 r.p.m., and sufficient sucrose solution as in Example 4 poured into it to come to within 1 mm. of the edge of the central hole.

By means of a hypodermic syringe, 0.5 ml. of suspension A is placed in the rotor and allowed to flow into a thin layer on the surface of the sucrose solution already there. A stop-clock is started at this instant.

Calculations of separation time are identical in form with those made for the rotor with axis horizontal. No account need be taken of the curved path of the particles, since gravity contributes nothing to the radial movement. It is necessary only to consider radial movement under the action of centrifugal force, and to collect the suspension when the desired size of particle has reached the pre-determined radius, irrespective of the actual length of the curved path.

Precisely as in Example 4, the probe movement is started at the appropriate time, and liquid containing all particles smaller than the chosen size drawn into a suitable sized volumetric flask.

Controls are set up by placing 0.5 ml. lots of suspension A direct into similar flasks. At the end of the separation, all flasks are made up to 100 ml. with the sucrose fill. From each one, a volume of 25 ml. is transferred to another flask, and to it added in turn 10 ml. of a 5% solution of sodium hydroxide, 1 gm. of sodium hydrosulphite and 50 ml. of ethyleneglycol monoethylether. The resulting solution of the leuco form of the dye is made up to 100 ml. with a further quantity of the sucrose solution. The optical densities of controls and separated fractions are compared by means of a suitable spectrophotometer, and the amount of dye in each fraction expressed as a percentage of the control.

*Table of separation times.*—In this example both the speed of rotation and volume of fill are kept constant.

Specific gravity of the particles is 1.75.

| Particle size (microns): | Total separating times |
|---|---|
| 25 | 43 secs. |
| 20 | 1 min 7 secs. |
| 16 | 2 min 49 secs. |
| 12 | 3 min 8 secs. |
| 10 | 4 min 30 secs. |
| 8 | 7 min. |
| 6 | 12 min 30 secs. |
| 4 | 28 min 12 secs. |

Result of the determination—

| Particle size (microns): | Weight percent undersize |
|---|---|
| 25 | 100 |
| 20 | 97 |
| 16 | 89 |
| 12 | 77 |
| 10 | 69 |
| 8 | 60 |
| 6 | 49 |
| 4 | 38 |

What we claim is:

1. In a centrifuge for separating particles in accordance with their relative rates of movement in a liquid under the combined influences of centrifugal and gravitational forces wherein said centrifuge includes a hollow container and means for mounting the container for rotation about an axis within the boundaries of said container, the improvement in sample withdrawing means for said centrifuge comprising:

a probe tube for insertion in said centrifuge for withdrawal of samples from the centrifuge, and means adjustably mounting said probe tube for withdrawing samples from an air-liquid interface in said centrifuge during rotation of the centrifuge about its axis, said last named means including means for moving said probe into contact with only the surface of liquid in the rotating centrifuge, said means continuing the movement of said probe at a rate which maintains said probe in contact with the air-liquid interface when said interface recedes because of the removal of liquid by said sample withdrawing means.

2. The improvement of claim 1 wherein said probe tube is moved into contact with the liquid surface by a cam means which maintains said probe in contact with the air-liquid interface when said interface recedes because of the removal of a liquid sample.

3. A method of sampling a liquid from a centrifuge while it is running, comprising the steps of:
- advancing a probe tube into the center of the running centrifuge so as to enter the centrifuge without disturbing the liquid which is to be sampled,
- moving the probe tube toward an air-liquid interface within said centrifuge and contacting only said interface during the sampling operation, and
- quickly removing the probe tube and a sample contained within the tube from the air-liquid interface and thereby collecting the sample without disturbing the liquid contents of the centrifuge.

4. The method of claim 3 and including the step of maintaining the probe tube in contact with only the air-liquid interface until the desired sample has been received within the tube.

References Cited by the Examiner

UNITED STATES PATENTS

| | | | |
|---|---|---|---|
| 555,893 | 3/1896 | Anderson | 223—47 |
| 1,242,560 | 10/1917 | Kingsbury | 233—21 |
| 1,695,990 | 12/1928 | Altpeter | 233—47 |
| 1,975,319 | 10/1934 | Grauss | 233—28 X |
| 2,817,970 | 12/1957 | Whitby | 233—26 X |
| 2,956,434 | 10/1960 | Donoghue | 233—27 X |
| 3,074,627 | 1/1963 | Goetz | 233—32 |

OTHER REFERENCES

Particle Size Determination, by R. D. Cadle, 1955, published by Interscience Publishers Inc., N. Y., pages 227 to 231, 236 and 238.

M. CARY NELSON, *Primary Examiner.*

H. KLINKSIEK, *Assistant Examiner.*